Jan. 21, 1964 S. C. SILVER 3,118,970

FREQUENCY MODULATION SIGNAL DETECTION SYSTEM

Filed May 11, 1960

INVENTOR.
SIDNEY C. SILVER
BY
Mitchell & Bechert

United States Patent Office 3,118,970

Patented Jan. 21, 1964

3,118,970

FREQUENCY MODULATION SIGNAL DETECTION SYSTEM

Sidney C. Silver, 259—36 148th Drive, Rosedale, N.Y.

Filed May 11, 1960, Ser. No. 28,490
5 Claims. (Cl. 178—5.8)

Figure 1:
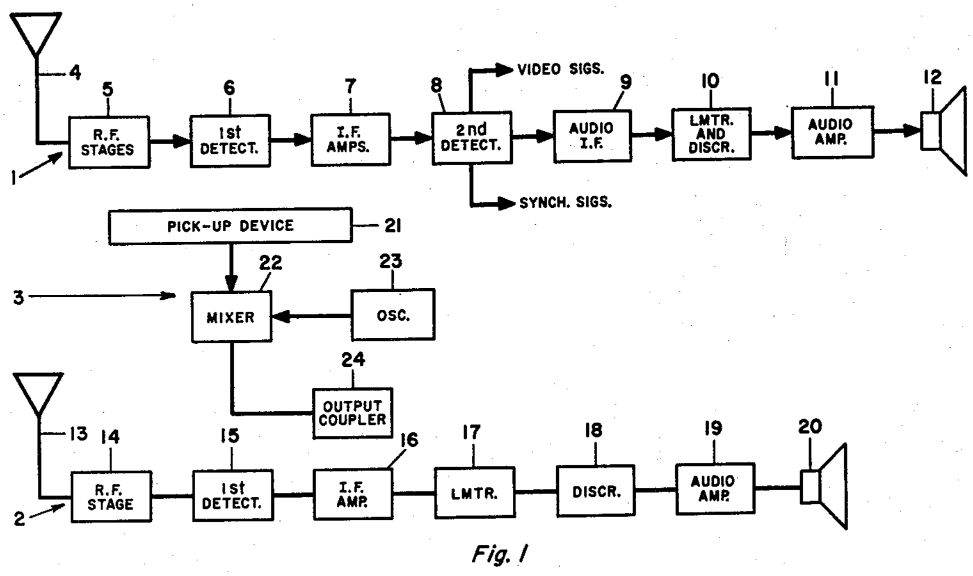

This invention relates generally to a method and means for the detection of a frequency modulated signal and more particularly to the detection of the frequency modulated audio portion of a received television signal.

At present, the standard transmitted television signal comprises a carrier signal amplitude modulated by the video information and utilizing an additional carrier at a fixed frequency separation (4.5 mc.) from the carrier frequency which is frequency modulated with the audio or sound portion of the broadcast. Inherently, the FM sound channel of the television signal contains a great amount of audio signal information and it is thus capable of being processed to reproduce an audio signal of excellent fidelity. It is recognized that almost all of the television receivers now in use are not capable of utilizing all of the audio information received in the television signal and thus causes appreciable deterioration and distortion to the audio signal prior to its reproduction.

One known method for improving the quality of the sound reproduced from the audio information in a received television signal is to alter the TV receiver by directly coupling a sound transducer system to the output of the final detector. For example, the output of the final detector of the TV receiver is coupled as the input to the audio amplifier of a high fidelity system. Such a method utilizes the better quality components of the high fidelity system in place of the generally inferior audio components of the television receiver. Unfortunately, considerable deterioration and distortion of the audio information occurs in the TV receiver prior to and during final detection and this loss cannot be corrected by improving the portion of the system after final detection. Moreover, such a method requires alteration of the TV receiver in order directly to couple the output of the final detector to the audio system.

One device which overcomes some of the above-mentioned disadvantages comprises a completely separate frequency modulation receiver which differs from the conventional FM receivers in that its input circuits are designed to receive the TV sound carrier frequencies rather than the frequency band of the conventional FM stations. This device is an independent unit, entirely separate from the TV receiver and must be separately tuned and operated as well as requiring its own power supply. In general, such a device is even more costly than a standard FM receiver due to its required tuning range. If a conventional FM receiver is available, it is, of course, possible merely to replace the RF tuner of the standard receiver with an RF tuner capable of receiving the TV frequency band, but such a device still possesses all of the disadvantages of the separate and independent sound system.

Accordingly, one of the objects of this invention is to provide a system capable of producing a demodulated audio signal of good quality from the audio information contained in a standard television signal.

Another object of this invention is to provide a device to extract the undeteriorated audio signal modulation in a television receiver prior to final detection for application to a high fidelity system.

Still further objects of this invention are to provide a simple device primarily utilizing unaltered existing equipment and which will not require adjustment, manipulation or tuning in use and which is stable and reliable, for producing high quality sound from the audio information contained in a received television signal.

In accordance with an aspect of the invention, means is coupled to the video amplifier or other portion of a conventional television receiver in which the audio carrier modulation energy is present, for coupling the audio information to a converter which alters the audio carrier frequency and applies the converted signal to the IF portion of a conventional FM receiver system.

Figure 2:
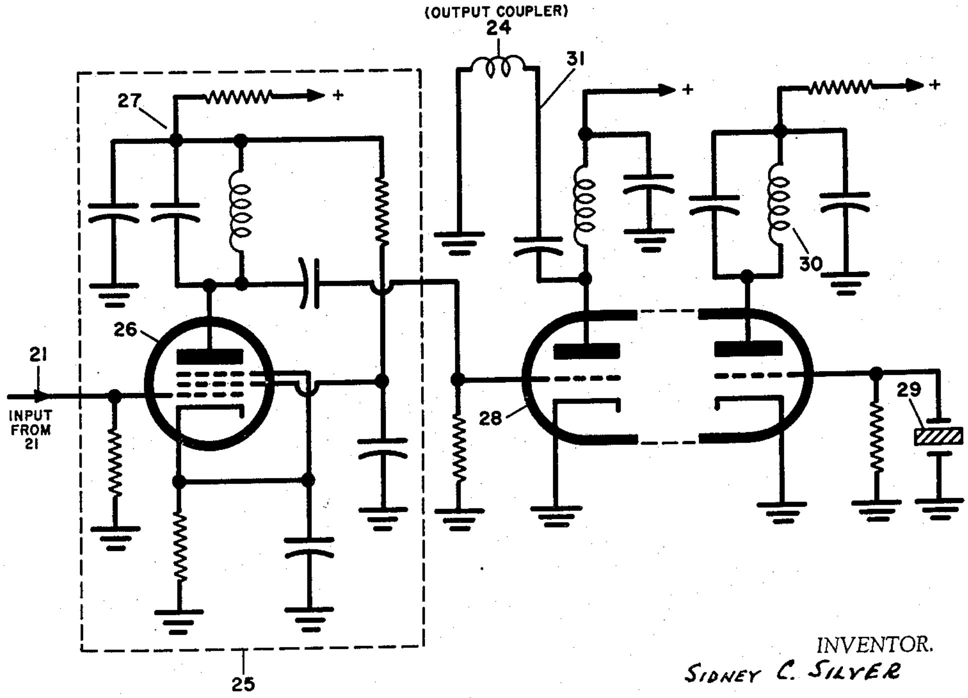

The above-mentioned and other objects and features of this invention and the manner of attaining them will become more apparent by reference to the following description taken in conjunction with the accompanying drawing, wherein:

FIG. 1 is a block diagram of a frequency modulation detection system in accordance with the principles of this invention; and FIG. 2 is a schematic circuit diagram of the embodiment of an oscillator-converter for use in the system of this invention.

Referring to FIG. 1, a frequency modulation signal detector system, in accordance with the principles of my invention, comprises a conventional television receiver 1, a conventional frequency modulation receiver 2 and a coupling unit 3. The television reeceiver 1 has a receiving antenna 4 which is coupled to the RF stage 5. The RF stage 5 may include an RF tuner and one or more RF amplifier stages. The output of the RF stage 5 is coupled to the first detector stage 6 where the received frequency is heterodyned with the output of an oscillator to produce the intermediate frequency (IF). Generally, the IF of a standard television receiver is in the 40 mc. region. The output of the first detector stage 6 is coupled to the IF amplifiers 7 whose output constitutes the input to the second detector 8, where the video, synchronizing signals and the intercarrier sound signals are separated. The video and synchronizing signals are utilized to control the cathode ray tube and generate the display of the video information contained in the received television signal while the sound signals are usually coupled through an audio IF amplifier 9 and a limiter and discriminator 10 to an audio amplifier 11, the output of which drives a loudspeaker 12.

The conventional FM receiver 2 couples the signals from its antenna 13 to an RF stage 14, the output of which is heterodyned in the first detector 15 to produce an intermediate frequency which is conventionally 10.7 mc. The IF output of the first detector stage 15 is coupled through IF amplifiers 16 to the limiter 17 and then to the discriminator 18, where the audio frequencies are detected and coupled through amplifier 19 to drive the loudspeaker 20.

The coupling unit 3, utilized in this invention, comprises an input coupling or pick-up device 21 which preferably, although not necessarily, consists of an inductive or capacitive coupling loop. Other known coupling devices may be employed in place of the coupling loop. The output of the pick-up device 21 is coupled to the mixer or converter circuit 22 whose other input comprises a fixed frequency from the oscillator 23. The output of the mixer 22 is fed to the output coupling device 24, which may also be an inductive or capacitive coupling loop.

Referring to FIG. 2, the coupling unit 3 comprises an amplifier 25, e.g., a pentode 26. The grid of the pentode 26 is coupled to the pick-up device 21. The plate circuit 27 of the pentode 26 is tuned to the beat frequency of 4.5 mc. which is the separation frequencyy between the video carrier frequency and the sound carrier frequency in the transmitted television signals. The output of the amplifier 25 is coupled to one grid of a dual triode 28. One half of the dual triode 28 functions as a fixed frequency oscillator having a crystal 29 coupled in its grid circuit, and its plate circuit 30 being tuned to the frequency of the crystal 29. The crystal 29 is tuned to a frequency equal to the difference between the beat frequency of the television signal and the intermediate frequency of the FM receiver. The output of the fixed frequency crystal oscillator is stray coupled to the mixer portion of the dual triode 28. The output of the mixer portion of the dual triode 28 is coupled from the plate at a frequency equal to the IF of the FM receiver and coupled over transmission line 31 to the output coupling device 24.

In operation, the pick-up device 21 is preferably placed near or in contact with a portion of the television receiver 1 which follows the second detector 8. It is only necessary that the pick-up device 21 couple energy from a portion of the TV receiver 1 where the sound beat frequency is present. The energy picked up from the television receiver is then heterodyned with the output of the fixed frequency oscillator 23 whose frequency is so chosen that one of the resultant signals produced is equal to the intermediate frequency of the FM receiver. This resultant signal still carries the audio modulation which was present in the original television signal. The heterodyned output is then transferred to the IF stages of the FM receiver by placing the output coupling device 24 near or in contact with the FM receiver, It is, of course, obvious the coupling unit may include one or more stages of amplification in its input and/or output.

Thus, it is seen that the above system produces a demodulated audio signal of good quality by utilizing existing circuitry of conventional televison and FM receivers wthout alteration to their existing circuitry.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signal coupling device for coupling the audio information in a television signal from a televison receiver to the intermediate frequency amplifier of a frequency modulation receiver, said signal coupling device comprising a signal pick up member adapted to be placed in close proximity to a stage in said television receiver preceding the final audio detector stage thereof, a frequency converter coupled to said signal pick up member, said frequency converter being adapted to receive a frequency modulated input signal having a center frequency equal to the difference between the video carrier signal and audio carrier signal of a television signal, said frequency converter being adapted to produce a frequency modulated output signal having a center frequency equal to the intermediate frequency of said frequency modulation receiver, and a signal output member coupled to said frequency converter, said signal output member being adapted to be placed in close proximity to an intermediate amplifier stage in said frequency modulation receiver.

2. A signal coupling device for coupling the audio information in a television signal from a television receiver to the intermediate frequency amplifier of a frequency modulation receiver, said signal coupling device comprising signal input means adapted to be coupled to said television receiver to receive an audio modulated input signal, a frequency converter coupled to said input means, said frequency converter being adapted to receive said audio modulated input signal and being operable to produce a corresponding audio modulated output signal having a center frequency equal to the intermediate frequency of said frequency modulation receiver, and signal output means for coupling said audio modulated output signal to an intermediate amplifier stage in said frequency modulation receiver.

3. The combination defined in claim 2 in which said signal input means and signal output means comprise inductive coupling members adapted to be placed in close proximity to predetermined stages of said television receiver and said frequency modulation receiver.

4. The combination defined in claim 2 in which said frequency converter is adapted to receive a frequency modulated input signal having a center frequency equal to the difference between the video carrier signal and audio carrier signal of a television receiver and also being operable to produce a frequency modulated output signal having a center frequency equal to the intermediate frequency of said frequency modulation receiver.

5. The combination defined in claim 4 in which said frequency converter comprises a heterodyne frequency mixer having two inputs and an output, an oscillator coupled to one input of said frequency mixer, the other input thereof being adapted to receive said frequency modulated input signal, and said oscillator being tuned to a frequency equal to the difference between the center frequency of said frequency modulated input signal and the intermediate frequency of said frequency modulation receiver.

References Cited in the file of this patent

UNITED STATES PATENTS

| | | |
|---|---|---|
| 2,686,221 | Avins | Aug. 10, 1954 |
| 2,865,987 | Megard | Dec. 23, 1958 |

OTHER REFERENCES

"FM and TV Sound Tuner," Morrissette Radio and TV News, November 1957, pp. 162, 164 and 165.

"TV Sound Tuner," Radio-Electronics, p. 46–48, June 1957.